United States Patent [19]

Wieske

[11] Patent Number: 4,888,197

[45] Date of Patent: Dec. 19, 1989

[54] PROCESS FOR PREPARING AN EDIBLE SPREAD CONTAINING A CONTINUOUS FAT PHASE AND AN AQUEOUS PHASE

[75] Inventor: Theophil Wieske, Hamburg, Fed. Rep. of Germany

[73] Assignee: Unilever Patent Holdings B.V., Rotterdam, Netherlands

[21] Appl. No.: 101,506

[22] Filed: Sep. 28, 1987

[30] Foreign Application Priority Data

Sep. 26, 1986 [EP] European Pat. Off. ......... 86201675.5

[51] Int. Cl.$^4$ ................................................ A23D 3/00
[52] U.S. Cl. ..................................... 426/602; 426/603; 426/804
[58] Field of Search ................ 426/602, 603, 607, 804

[56] References Cited

U.S. PATENT DOCUMENTS

| | | | |
|---|---|---|---|
| 4,404,231 | 9/1983 | den Hollander et al. | 426/602 |
| 4,482,576 | 11/1984 | Boot et al. | 426/606 |
| 4,510,167 | 4/1985 | Schmidt et al. | 426/607 |

FOREIGN PATENT DOCUMENTS 0101104  2/1984  European Pat. Off.

*Primary Examiner*—Donald E. Czaja
*Assistant Examiner*—Celine T. Callahan
*Attorney, Agent, or Firm*—Cushman, Darby & Cushman

[57] ABSTRACT

Process for preparing an edible spread containing a continuous fat phase and an aqueous phase, comprising mixing a first fraction, consisting of a separately prepared water-and-oil emulsion, of which the fat phase consists of fat having an N2O below 5%, which fat phase has a temperature below 35° C., with a second fraction consisting of fat having an N2O of at least 7%, which second fraction has a temperature at which said second fraction has an N-value of at least 10%. Optionally a third fraction may also be mixed with the first and second fractions.

15 Claims, 1 Drawing Sheet

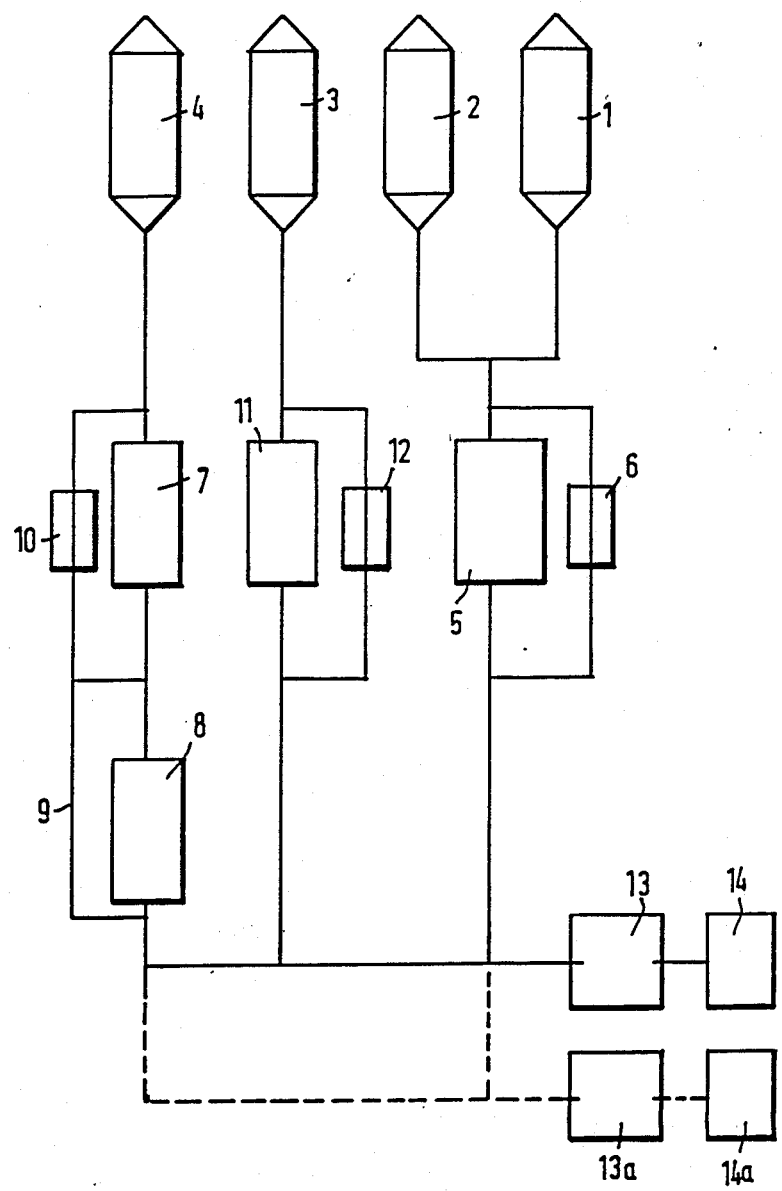

PROCESS FOR PREPARING AN EDIBLE SPREAD CONTAINING A CONTINUOUS FAT PHASE AND AN AQUEOUS PHASE

The invention is directed to the preparation of an edible dispersion, containing a continuous fat phase and an aqueous phase, which process comprises the combination of two or more separate streams. Such processes are referred to in literature as socalled split-stream processes.

Spreads, as a typical example of such dispersions, are, up till now, generally produced by simultaneously cooling, crystallizing and emulsifying combined fat- and aqueous phases. The production process for each product having a different fat composition and/or fat content is therefore optimized separately, and separate tank and e.g. Votator aggregates are necessary for each product. Moreover these aggregates as well as the capacity of the packing line have to be adjusted to the specific products.

Another disadvantage of the conventional processes used in the manufacture of fat products, such as spreads, is that a higher residence time in the production line, as is generally desired, inevitably leads to a reduction of the packing capacity and a lower overall efficiency.

Yet another problem in conventional fat-product manufacture is that, due to the strong dynamic crystallization in coolers, it is necessary to have considerable reworkfacilities installed for cases of packing machine standstill.

A further disadvantage of conventional production processes is that the generally accepted compromise between plant efficiency and good and stabilized product properties implies the change of product properties during storage and distribution, due to the presence of instable (co-crystallized) fat crystal structures.

Split stream processes that have been proposed in the past, such as the processes described in EP-A 0 101 104, and GB-A 1 327 511, have the disadvantage that they require an extra amount of rework. The process described in EP-A 0 101 104 concerns separate processing, wherein both the separate fat phase and the separate artificial cream are recirculated, and the final emulsion is obtained by mixing the processed components together. Especially in case the process is used for the manufacture of spreads comprising duplex structures, i.e. O/W/O dispersions, the process of EP-A 0 101 104 provides the advantage of a decrease in productloss on packing machine stand still.

SUMMARY OF THE INVENTION

The new process described herein tries to solve all of the above cited problems and disadvantages, or at least to minimize their negative influence. Furthermore the present process allows the degree of process flexibility to be extended, and also the possibilities to substantially increase throughput are increased. The present new approach comprises essentially a separation of the emulsification and the crystallization processes.

The present invention therefore concerns a process for preparing an edible dispersion containing a continuous fat phase and an aqueous phase, said process comprising mixing a first fraction, consisting of a separately prepared water-and-oil emulsion, of which the fat phase consists of fat having a N20 below 5, which fat phase has a temperature below 35° C., with a second fraction having a N20 of at least 7, which second fraction has a temperature at which the N-value of said fraction is at least 10%, preferably at least 15%. The N-values as used throughout this application are measured after the fraction or fat-phase of which the N-value is determined has been crystallized to equilibrium. The N-value of the fat-phase of a water-and-oil emulsion is determined in the absence of the waterphase. The N-value represents the amount of solids (crystallized) in the fat as measured by the NMR-method described in Journal of American Oil Chemists' Society, 51 (1974), 316 by Van Putte et al.

The term "water-and-oil emulsion" as used here is meant to encompass water-in-oil (W/O) emulsions, O/W emulsions, and also more complicated emulsions such as for example O/W/O and W/O/W emulsions. In the process according to the invention preferably a water-and-oil emulsion in the form of a water-in-oil emulsion is used.

The temperature-limits as given above for the two separate fractions apply to the temperature of said fractions just before mixing.

By separately processing the above two fractions, energy may be saved, as fraction 1 requires relatively little cooling capacity and/or shear. Therefore it is sufficient to use relatively simple heat-exchangers and/or stirring means for processing fraction 1. For instance Votator cooling-capacity, may be saved, as fraction 1 may be cooled by one or more simple heat-exchangers, such as for example static heat-exchangers, or heating coils. The term "static" is used here in more or less the same meaning as in "static mixer", i.e. an apparatus devoid of moving parts which beat the compostion passed therethrough, although said apparatus may be constructed in such a manner that it induces some mixing of the components passed therethrough. In order to thoroughly mix fraction 1, it may suffice to use a simple stirring device, although also, for example, a non-cooled Votator, a Petzold mixer or a static mixer may be used. In a preferred embodiment of the present process, fraction 1 is not cooled or cooled by means of static heat-exchangers or low-shear heat-exchangers, preferably the fraction is cooled solely by means of static heatexchangers. In the present process preferably a static heat-exchanger is used which has an essentially tubular shape, supplied with a cooling-coil or cooling jacket, through which tubular heat-exchanger the composition to be cooled, may be fed.

In practice about 40–90, and in general 50–90 wt. % of the total product do not require effective chilling and mixing in non-static heat-exchangers, such as for example Votators, together with the crystallizing fats. The permanent fluid part, i.e. fraction 1, of the product may therefore be processed separately and can be combined with the crystallized fat part at later stage.

BRIEF DESCRIPTION OF THE DRAWINGS

FIG. 1 represents a flow sheet illustrating the present process.

PREFERRED EMBODIMENT OF THE INVENTION

Preferably the process according to the invention is used for the manufacture of spreads, comprising from 18–95, more preferably 38–90, wt. % of fat. Additionally, in the present process, about 5–70 wt. %, preferably 10–62 wt. % of water is incorporated in the final product.

The N20 of the first fraction is preferably below 2, and N20 of the second fraction is preferably at least 10.

Even more preferred is a process wherein the difference in N20 between the first and second fraction is at least 5, in particular at least 7 %.

Additionally, in the present process the water-and-oil emulsion used as the first fraction is preferably cooled to a temperature between 5° and 20° C.

In this application, by fat is meant, unless indicated otherwise, an edible substance, which may be solid or liquid at ambient temperature, consisting essentially of triglycerides such as, for example, soybean oil, sunflower oil, palm oil, coconut oil, fish oil, lard and tallow, which may have been partially or completely hydrogenated or modified othrwise, or comprising non toxic material having physical properties similar to triglycerides, which material may be indigestible, such as for example waxes, e.g. jojoba oil and hydrogenated jojoba oil, and poly fatty acid esters of mono- and disaccharides, e.g. sucrose octa fatty acid ester, or mixtures thereof. The terms fat and oil, in this application, are used interchangeably.

In yet another preferred embodiment the second fraction consists of a fat or fat blend, having a 'flat' N-line, i.e. an N10 of between 10 and 45%, an N20 of between 6 and 30 %, and a ratio of N10/N30 of smaller than 5.5, preferably smaller than 3.5. The lower limits of the N10 and N20 values of phase 2 are determined by the requirement that the final product should retain sufficient stability at around ambient temperature, whereas the upper limits thereof are governed by the necessity that the product must be pumpable at crystallization temperature.

The main advantages that may be obtained by the present process are as follows: Stable products may be prepared by combining separately chilled liquid emulsions with the crystallized fat components, thereby obviating the use of expensive equipment with external chilling and high shear rates, such as for example Votators (A-units). Cheaper heat exchangers than for example Votators may be used to effectively chill the liquid phase. Moreover, due to the absence of large amounts of crystallized fat, also thorough mixing of the liquid phase may be obtained, without the necessity of a high shear mixing device. The amount of rework in case of standstill of the packing line is minimized, as fraction 1 does not need reworking. The production is greatly increased, namely up to about 80-100%, due to the fact that reasonable residence times of the crystallized fat in the Votators are not combined with a corresponding reduction of the production-rate. Due to the fact that higher residence times are attainable, it is possible to obtain fat products of which the fat phase has crystallized to (near) equilibrium, so that the properties of these products do not substantially change upon storage. Moreover it is thus possible to manufacture products of constant quality. Bacteriological problems are reduced, as only part of the equipment used in the manufacture of the product comes into contact with water, which also reduces the cleaning requirements. Since only part of the total product volume needs to pass the high shear heat-exchangers, such as for example Votators, less of these heat exchangers, are needed, and the remaining Votators are used more efficiently. Moreover also less energy is needed than in similar conventional processes. By optimizing the present process it is possible to better adjust the properties of the crystallized high melting fats, thereby reducing the amount of hardened and/or interesterified fat-fractions needed. Upon using the process according to the present invention, the flexibility of a production system is greatly increased, especially if more than one product is manufactured, as more than one product may be manufactured, by means of the same system, using the same fractions, by adapting the mix-ratio(s).

In a further preferred embodiment in addition to fraction 1, and fraction 2, a third fraction is mixed therewith, said third fraction comprising fat having a steep N-line. A margarine fat blend in general may be thought of as being composed of 3 different 'partial blends' (at 10° C.): Part 1. 50–85 wt. % (permanent) liquid phase. Part 2. 5–35 wt. % (permanent and constant) solids-phase. Part 3. 0–30 wt. % (variable) solids-phase. The term "permanent", as used here, indicates that the fraction has a virtually constant solids content over the complete range of temperatures to which the product is subjected during normal use, i.e. temperatures ranging from about 10° to 30° C.

The term "variable", on the contrary, indicates that the fraction has a solids content that varies considerably with temperature-changes within the range of about 10°–30° C. The term "constant" indicates that the fat has almost completely crystallized to equilibrium.

In principle one could, if these phases were available in pure form, treat part 1 separately outside the Votator, crystallize part 2 to an equilibrium condition, and optionally combine these two phases with part 3, which requires dynamic cooling and crystallization, to the final composition. By crystallization to equilibrium is meant that most of the fat crystals have attained there final crystal-form and upon storage are not converted to a more stable crystal-form.

As both part 1 and the water phase (usually making up from 10% to 65% of the product) are liquid at the temperatures normally applied in spread processing, it is no use to chill these phases by means of complicated heat-exchangers such as Votators. Part 1 and the water phase, combined in fraction 1, may be chilled in a vessel before being pumped into the production-line, or said fraction may be cooled by means of simple heat exchanger (i.e. no Votators), before being mixed with other fraction(s).

Fraction 2 does require efficient cooling to initiate crystallization and also sufficient residence time to arrive at almost complete equilibrium crystallization. This type of fat preferably has a typical 'flat' N-line, and shows already a very high degree of crystallization at about 20° C. and below. The composition of this fat phase is however, of course, to be controlled for its contribution to the final N35-value, which preferably is between 0 and 5 wt. %. More in particular the upper limit is 3wt. %.

Fraction 3 as a typical 'steep' N-line fat may be incorporated to further adjust the final product properties, and to differentiate the product from other products. This fat-fraction requires efficient A-unit type coolers, among other things to adjust the viscosity of the product at packing. Good quality products are obtainable without the incorporation of the third fraction. Examples of such products are the socalled health-margarines, containing a high amount of polyunsaturated fatty acid residues in combination with a hardstock having a flat N-line, and margarines for kitchen use, which may be produced by mixing a liquid fraction consisting of water and permanent liquid oil, with a fat fraction having a flat N-line and a melting point of above 35° C.

The preparation of the water phase is, in principle, identical to the conventional preparation, although it is preferred to make the water phase suitable for more than one product and to add additional specific components later on.

The liquid oil present in fraction 1 is preferably cooled to about 5°–20° C. and all ingredients (fat soluble) can be added. The emulsifiers used., such as for example monoglycerides and lecithins are thus automatically present at relatively high concentration levels, allowing an easier adsorption of these interfacially active material at the emulsion interface. As a result thereof a higher emulsion stability at low temperatures is obtained.

Furthermore usual soluble ingredients such as salt, condensed milk, proteins, sugars, acidity regulators and, if necessary, preservatives and flavours, may be added to the cold emulsion phase.

The water phase and the liquid phase are preferably combined in a ratio of water phase : liquid oil of about 1:0.2 to 1:4, preferably 1:0.75 to 1:1.5, and emulsified to yield a stable water-and-oil premix emulsion at about 0°–35° C., preferably 0°–30° C. For this emulsification the normal and effective emulsification equipment may be used, such as, for example a conventional stirring device. The water droplet distribution of the final product is preferably already mainly achieved at this stage of the process. Thus the viscosity of fraction 2, and optionally fraction 3 can not substantially affect the water droplet distribution in the final product. Products of constant quality, i.e. water droplet distribution may thus be obtained. In order to counteract coalescence, it is sometimes adviseable to slightly increase the viscosity of fraction 1 by the addition of a small proportion of a fat having a high solids content.

The emulsion phase is preferably held in an internal loop rom which, at running the packing line, the emulsion is fed into the final mixing vessel. For bacteriological reasons provision is made for a pasteurizing unit either within the emulsion loop or before final mixing with the other fat phases. This pasteurization thus is required for only part of the final product.

Examples of liquid oils of part 1, suitable for use in fraction 1 are: rapeseed oil, soybean oil, cottonseed oil, sunflower oil, groundnut oil, and mixtures thereof.

Fraction 2 preferably consists of fats having an N10 of at least 70% and an N30 of at least 30%. To keep fraction 2 pumpable it is advisable to have some liquid oil incorporated in fraction 2. Suitable fats for fraction 2 are hardened fats, such as palm oil, soybean oil, rapeseed oil or cottonseed oil, hardened to a melting point of about 42° C, or palmolein hardened to a trans-content of more than 25%. Randomized mixtures of different hard fats or hydrogenated fractions, such as for instance high melting stearin fractions like palm stearin or corandomized mixtures with a sufficiently high content of saturated high melting fatty acid, are also suitable. Butter-stearin is an example of a stearin fraction that may successfully be applied in the process according to the present invention.

The complete fraction 2 is preferably fed from a warm storage tank through an A-unit to initiate crystallization, and subsequently through a sufficiently large crystallizer of the C-unit type to complete crystallization. The above set-up can be used as an internal loop (or only a C-unit loop) from which the proper proportion is dosed into the mixer when packing proceeds. Excessive residence times (as may occur during long breakdown periods) within the loop, which may lead to unacceptable crystal growth, may require warming up facilities within the loop.

Fraction 2, preferably crystallized to near equilibrium, will constitute the major 'backbone' of the crystal mass stabilizing the product and safeguarding sufficient standup at all practical temperatures.

As indicated above, it is preferred to incorporate a third separate fraction into the final blend, to tune the steepness of the solids curve, and thereby the melting behaviour, of the final product, and also to influence the viscosity of the product at packing and to enhance quick product stabilization after mixing and packing.

Fraction 3 preferably consists of a fat having a steep N-line, more in particular the fat has a N10/N30 ratio of more than 5.5, preferably more than 8. Suitable fats having this characteristic are well known to the person skilled in the art. Examples thereof are i.a. rapeseed oil, sunflower oil, cottonseed oil, hardened to a melting point of about 36° C., under conditions favouring a high trans-content, sunflower oil hardened to a melting point of 32° C., palmoleins and hardened palmoleins, preferably with transcontents of about 20%. It is also possible to use suitable corandomized fat mixtures. Of course one may also use mixtures of two or more fats to obtain a fat having a steep N-line.

Both the second and third fraction contribute to the solids content of the final product, between, for instance, 5 and 25° C. Since however the third fraction is used to tune the characteristics of the final product, it is preferred to use a third fraction that has a N-line which is clearly steeper than the N-line of the second fraction. Preferably therefore the N10:N30 ratio of the third fraction is twice as high, more preferably thrice as high, as the N10:N30 ratio of the second fraction.

Preferably the warm liquid fraction 3 is passed through one or a series of A-units and fed into the final mixer to induce a predetermined degree of "posthardening" to the final C-value. Since fat fraction 3 crystallizes rapidly under chilling conditions, it is preferred to directly dose said fraction into the final mixer, without applying additional residence times or C-units. During stand-still this fat fraction 3 requires recirculation through a heat exchanger to remelt the fat.

For a continuously running production line the separate fractions are being dosed, in the pre-set proportions, into a mixing device of relatively small volume and fed into the packing machine without extra residence time being required, although of course packing machines may have some residence time themselves. The filling temperature preferably is below 20° C., and, depending on the product properties wanted, may be even as low as 10°–15° C. The temperature of the final blend should allow proper filling. Any mixing equipment yielding a homogeneous mixture of all fractions, without raising the temperature too strongly, appears suitable. It appears possible to obtain homogeneous mixtures at fairly low shear rates. Such low shear rates can be obtained on using mixing devices such as for example static mixers and cavity transfer mixers.

In order to fully utilize the potential flexibility of the process of the present invention it may be advantageous to directly dose liquid oil into the mixing device, i.e. not via the emulsified phase. This variable may prove useful to tune the level of poly-unsaturated fatty acids in the final product.

The final hardness of the product will be reached after filling, and crystallization of the fraction 3 solids. The type and composition of fraction 3 is therefore governed by the ultimate requirements with respect to the product's hardness at for example 5° C. and 20° C.

In the preparation of butterlike margarines, or melanges, it is preferred to include butterfat or its olein fraction in fraction 3.

The relative proportions of the various fractions determine the properties of the emulsion obtained. In general the ranges of the amounts of fractions (calculated on the final product) are as follows:
fraction 1: 17.5–90 wt. %
fraction 2: 5–82.5 wt. %
fraction 3: 0–72.5 wt. %.

The advantages of the present process are especially appreciated in fat products comprising relatively large amounts of liquid components, such as liquid oil and water. In a very preferred embodiment the first fraction therefore contributes to more than 25, in particular more than 50 wt. % of the final product.

In most fat products the amount of fraction 2 that is required to obtain a product of good quality, ranges from 5–60 wt. %. Preferably, however, especially in case also a third fraction, having a steep solids curve, is admixed, the amount incorporated lies between 15 and 30 wt. % of the final product.

FIG. I shows in principle the essential set-up of a plant for carrying out the process of the invention. More detailed variants, such as those described above, are not reflected by this general flow sheet.

In the flow sheet vessels (1, 2, 3 and 4) are provided, containing the water phase (1), and the fluid fat (2) of the W/O emulsion, optional fat fraction 3 (3), and fat fraction 2 (4). The water phase (1) and liquid phase (2) are emulsified in emulsifying equipment (5). In order to maintain a stable emulsion, a recycle via (6) is provided for.

Fat fraction (2) is fed from (4) to a surface scraped heat exchanger (7) (Votator or A-unit). After the A-unit the fat phase is further treated in a crystallizer (8), with partial or complete recycle via (9) and (10). Optional fat fraction 3 (3) is likewise cooled in Votator (11) with recycle (12).

The various process streams are mixed in the required ratio in mixing vessel (13) and packed in packing machine (14). Optionally a second mixing and packing line (13a, 14), connected to the same vessels holding the starting materials, can be provided for. This second mixing and packing line may use the same starting materials for the production of another product, having clearly different characteristics, by mixing the fractions in different proportions.

The invention is illustrated by means of the following Examples:

EXAMPLE 1

A margarine was prepared from three separate fractions, having the following composition (weight percentages calculated on total product) and properties:
Fraction 1:
20 wt. parts aqueous phase containing all water soluble components,
16 wt. parts soybean oil
Fraction 2:
8 wt. parts palmoil, hardened to a melting point of 42° C.,
8 wt. parts palm oil,
8 wt. parts soybean oil N10-value of this fraction was 35%, the N30-value was 10%. The N10:30 ration of the fraction therefore was 3.5.
Fraction 3:
16 wt. parts soybean oil, hardened to a melting point of 36° C., containing 60% of trans-unsaturated fatty acid residues,
4 wt. parts palm oil,
12 wt. parts palmkernel oil,
8 wt. parts soybean oil.
The N10-value of this fraction was 40%, the N30-value was 4%.

The three fractions mentioned above were separately processed, and prior to packing, mixed in a ratio 36:24:40 for fraction 1:fraction 2:fraction 3.

An excellent margarine was thus produced, using less cooling capacity in comparison with conventional methods.

EXAMPLE 2

In the same way as described in Example 1, a margarine was prepared from three fraction, having the following composition:
Fraction 1:
20 wt. parts of aqueous phase
10.4 parts of soybean oil
Fraction 2:
32 parts of a corandomized mixture of
40 wt. % palmoil
30 wt. % hardened palm oil
30% coconut oil
9.6 parts of soybean oil
The N10-value of this fraction was 41%, the N30-value was 8%.
Fraction 3:
20 wt. parts of soybean oil hardened to a melting point of 36 C (trans content 60%)
8 wt. parts of soybean oil
The N10-value of this fraction was 45%, the N30-value was 4%.

Fractions 1, 2 and 3 were processed separately, and mixed in respective ratios of 30.4:41.6:28.

EXAMPLE 3

A margarine was produced from two separate fractions, having the following composition:
Fraction 1:
Soybean oil (44 wt. %)
Water (20 wt. %), containing the usual water-soluble components.
Fraction 2:
Soybean oil hydrogenated to a melting point of 36° C.
Palm oil hydrogenated to a melting point of 44° C.

Fraction 1 was cooled to a temperature of 1° C., by means of cooling coil. Fraction 2 was processed through an A-unit (900 rpm) and a C-unit (150 rpm), before it was mixed with fraction 1, by means of a cavity transfer mixer (500 rpm). After the A-unit fraction 2 had a temperature of 1920 C. Before mixing, after having passed the C-unit, fraction 2 had a temperature of 23° C., and a solids content of 16%. The product was obtained at a production speed of 8 kg/h, and had a solids content of 10%, and a temperature of 19° C.

The product obtained did not exhibit any texture deficiencies, such as graininess or sandiness, nor did it loose any moisture on storage. The hardness of the product at 5° C. as represented by the C5-value was 1500.

The above example was repeated with the exception that the throughput of the productionline was 4 kg/h. Also the temperature of fraction 2, after the A-unit was 22.5° C., and after the C-unit, before mixing, the temperature of the fraction was 28° C. (solids content of 12%). The product obtained had a temperature of 1920 C., a solids content of 9.2%, and a C5-value of 1200. Again the product obtained displayed very good properties.

I claim:

1. A process for preparing an edible spread containing a continuous fat phase and an aqueous phase comprising (a) providing a first fraction consisting of a separately prepared water-and-oil emulsion of which the fat phase of the water-and-oil emulsion consists of fat having an N20 below 5% (b) providing a second fraction consisting of fat having an N20 of at least 7%; (c) adjusting the temperature of said fractions so that the temperature of the first fraction is below 35° C. and the temperature of the second fraction is one at which the N-value of said second fraction is at least 10%; and (d) mixing the first and second fractions together while the said first fraction is at a temperature below 35° C. and the second fraction is at the temperature at which the N-value thereof is at least 10%

2. Process according to claim 1, wherein the edible spread comprises. from 30-95 wt. % of fat.

3. Process according to claim 1, wherein the difference in N20 value between the first and second fraction is at least 5%.

4. Process according to claim 1, wherein the second fraction has a N10 between 10 and 45%, a N20 between 6 and 30% and a ratio of N10:N30 of less than 5.5.

5. Process according to claim 1, wherein fat phase of the first fraction has a N20 below 3%, and the second fraction has a N20 of at least 10%.

6. Process according to claim 1, comprising cooling the first fraction to a temperature between 5° and 20° C., before admixing it to the second fraction.

7. Process according to claim 1, comprising mixing 17.5-90 wt. % of the first fraction with 10-82.5 wt. % of the second fraction.

8. Process according to claim 1, comprising mixing more than 50 wt. % of the first fraction with the second fraction.

9. Process according to claim 1, comprising cooling the first fraction 1 by passing it through one or more static heat-exchangers.

10. Process according to claim 1, comprising admixing a third fraction to the first and second fraction, said third fraction having a N10:N30 ratio of more than 5.5.

11. Process according to claim 10, wherein the N10:N30 ratio of the third fraction is at least twice as high as the N10:N30 ratio of the second fraction.

12. Process according to claim 10, comprising admixing 5-72.5 wt. % of the third fraction to the first and second fraction.

13. Process according to claim 1, wherein first fraction comprises an oil selected from the group consisting of rapeseed oil, soybean oil, cottonseed oil, sunflower oil, ground nut oil, and mixtures thereof.

14. Process according to claim 1, wherein the second fraction comprises an oil selected from the group consisting of hardened palmoil, hardened soybean oil, hardened rapeseed oil, hardened cottonseed oil, high melting stearin fraction, corandomized fat mixture, and mixtures thereof.

15. Process according to claim 10, wherein the third fraction comprises an oil selected from the group consisting of hardened rapeseed oil, hardened sunflower oil, palmolein, hardened palmolein, hardened soybean oil, corandomized fat mixture, butterfat, butterfat olein, and mixtures thereof.

* * * * *